(12) United States Patent
Athad

(10) Patent No.: US 11,471,953 B2
(45) Date of Patent: Oct. 18, 2022

(54) DOUBLE-ENDED CUTTING INSERT HAVING MOUNTING PROJECTION WITH INSERT UPPER ABUTMENT AND INSERT STOPPER SURFACES

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 232 days.

(21) Appl. No.: 17/069,974

(22) Filed: Oct. 14, 2020

(65) Prior Publication Data

US 2021/0023633 A1 Jan. 28, 2021

Related U.S. Application Data

(62) Division of application No. 16/357,458, filed on Mar. 9, 2019, now Pat. No. 10,857,603.

(51) Int. Cl.
  *B23B 29/04* (2006.01)
  *B23C 5/10* (2006.01)
  *B23C 5/22* (2006.01)

(52) U.S. Cl.
  CPC ...... *B23B 29/043* (2013.01); *B23B 2200/082* (2013.01); *B23C 5/109* (2013.01); *B23C 5/2213* (2013.01); *B23C 2200/0472* (2013.01)

(58) Field of Classification Search
  CPC ....... B23B 29/06; B23B 29/043; B23B 29/04; B23B 2200/082; B23B 2200/165; B23B 29/02
  See application file for complete search history.

(56) References Cited

U.S. PATENT DOCUMENTS 3,551,977 A   1/1971   Novkov
5,159,863 A   11/1992  Simpson, III
(Continued)

FOREIGN PATENT DOCUMENTS

DE   20 2009 014 789 U1   3/2010
EP        0477480 A2      4/1992
JP      2006-263845       10/2006

OTHER PUBLICATIONS

International Search Report dated Jun. 23, 2020, issued in PCT counterpart application (No. PCT/IL2020/050198).
(Continued)

*Primary Examiner* — Alan Snyder
(74) *Attorney, Agent, or Firm* — Womble Bond Dickinson (US) LLP

(57) ABSTRACT

A cutting tool includes a two-way indexable cutting insert clamped in a transversely oriented insert receiving pocket of an insert holder. The insert holder includes a forwardly located insert mounting portion that includes upper and lower jaws which together define the insert receiving pocket having a pocket front opening. The lower jaw includes a pocket lower clamping surface. The upper jaw includes a pocket upper clamping surface which faces mutually towards the pocket lower clamping surface and a pocket stopper surface facing generally towards the pocket front opening. The pocket stopper surface is closer to the pocket lower clamping surface and further from the pocket front opening, than the pocket upper clamping surface. The pocket stopper surface is further from the pocket rear opening than the pocket lower clamping surface.

16 Claims, 7 Drawing Sheets

(56) References Cited

U.S. PATENT DOCUMENTS

| | | |
|---|---|---|
| 5,161,920 A | 11/1992 | Zinner |
| 5,833,403 A | 11/1998 | Barazani |
| 5,836,723 A | 11/1998 | Von Haas et al. |
| 7,665,933 B2 | 2/2010 | Nagaya et al. |
| 8,647,029 B2 | 2/2014 | Hecht |
| 8,696,262 B2 | 4/2014 | Hecht |
| 9,033,622 B2 | 5/2015 | Hecht |
| 9,120,239 B2 | 9/2015 | Hecht |
| 2008/0240874 A1 | 10/2008 | Nagaya et al. |
| 2009/0000454 A1* | 1/2009 | Baernthaler .......... B23B 29/043 83/843 |
| 2010/0067992 A1 | 3/2010 | Uchijo et al. |
| 2010/0119314 A1 | 5/2010 | Nagaya et al. |
| 2011/0158756 A1 | 6/2011 | Athad |
| 2011/0255926 A1 | 10/2011 | Hecht |
| 2013/0058729 A1 | 3/2013 | Choi et al. |
| 2013/0170917 A1 | 7/2013 | Hecht |
| 2013/0202372 A1 | 8/2013 | Hecht |
| 2013/0294854 A1 | 11/2013 | Lee |
| 2014/0133924 A1 | 5/2014 | Oren et al. |
| 2014/0321926 A1 | 10/2014 | Sadikov |
| 2015/0224581 A1 | 8/2015 | Tsuda |
| 2017/0333997 A1 | 11/2017 | Kusuda |

OTHER PUBLICATIONS

Written Opinion dated Jun. 23, 2020, issued in PCT counterpart application (No. PCT/IL2020/050198).

* cited by examiner

DOUBLE-ENDED CUTTING INSERT HAVING MOUNTING PROJECTION WITH INSERT UPPER ABUTMENT AND INSERT STOPPER SURFACES

RELATED APPLICATIONS

This is a Divisional of U.S. patent application Ser. No. 16/357,458, filed Mar. 19, 2019, now U.S. patent application Ser. No. 10857603. The contents of the aforementioned application are incorporated by reference in their entirety.

FIELD OF THE INVENTION

The subject matter of the present application relates to cutting tools, and in particular to cutting tools designed for internal cutting operations on a workpiece, of the type in which a cutting insert is releasably clamped in a transversely oriented insert receiving pocket provided on an insert holder.

BACKGROUND OF THE INVENTION

Cutting tools for internal cutting operations on a workpiece can include an insert holder, and a cutting insert releasably clamped in a transversely oriented insert receiving pocket. The insert holder can include upper and lower jaws spaced apart by a clamping recess with the insert receiving pocket located in the clamping recess.

The insert receiving pocket can include a pocket stopper surface for positioning the cutting insert in a predefined position when inserting the cutting insert into the insert receiving pocket. The pocket stopper surface is formed on a stopper support portion located behind the pocket stopper surface to provide strength and rigidity to the pocket stopper surface.

Examples of such an insert receiving pocket are disclosed in, for example, EP 0 477 480 A2 and US 2017/333997 A1 where the pocket stopper surface is formed on the lower jaw and abuts a rearward portion of the cutting insert. However, one disadvantage of such an insert receiving pocket is that the stopper support portion contributes to the radial dimension of the cutting tool. This is disadvantageous for insertion of the cutting tool into small holes (e.g. when boring or internal grooving).

It is an object of the present invention to provide an insert holder, provided for a cutting tool designed for internal cutting operations on the workpiece, having an insert receiving pocket that significantly reduces or overcomes the aforementioned disadvantages.

It is a further object of the present invention to provide a cutting insert configured to be received into the insert receiving pocket.

It is a yet further object of the present invention to provide a cutting tool provided with both the insert holder and the cutting insert.

SUMMARY OF THE INVENTION

In accordance with a first aspect of the subject matter of the present application there is provided an elongated insert holder, having a holder longitudinal axis defining opposite forward to rearward directions, the insert holder comprising:
 a holder peripheral surface extending circumferentially about the holder longitudinal axis, the holder peripheral surface intersecting, and forming a boundary of, a holder end surface at a forward end of the insert holder;
 a shank portion and an insert mounting portion located at a forward end thereof, the insert mounting portion comprising:
  upper and lower jaws which are spaced apart by a clamping recess, the clamping recess being recessed in the holder end surface and opening out to the holder peripheral surface at first and second recess side openings, the upper jaw being movable with respect to the lower jaw by rotating around a pivot axis; and
  a transversely oriented insert receiving pocket configured to receive a cutting insert therein, the insert receiving pocket being formed in the clamping recess and defined, at least partially, by pocket upper and lower surfaces formed on the upper and lower jaws, respectively, and extending longitudinally along a pocket longitudinal axis to the first and second recess side openings to define opposite pocket front and rear openings, respectively; wherein:
   a pocket longitudinal plane located between the pocket upper and lower surfaces contains the pocket longitudinal axis;
   the pocket lower surface comprises a pocket lower clamping surface;
   the pocket upper surface comprises:
    a pocket upper clamping surface which faces mutually towards the pocket lower clamping surface; and
    a pocket stopper surface, facing generally towards the pocket front opening;
   the pocket stopper surface is closer to the pocket lower clamping surface and further from the pocket front opening, than the pocket upper clamping surface; and
   the pocket lower clamping surface extends along the pocket longitudinal axis, closer to the pocket rear opening than the pocket stopper surface.

In accordance with a second aspect of the subject matter of the present application there is provided a cutting tool comprising:
 an insert holder of the type described above; and
 a cutting insert, releasably clamped in the insert receiving pocket.

In accordance with a third aspect of the subject matter of the present application there is provided a double-ended cutting insert, longitudinally elongated in a direction defining an insert longitudinal axis, comprising:
 two opposing insert end surfaces and an insert peripheral surface extending therebetween, the insert peripheral surface extending circumferentially about the insert longitudinal axis and comprising opposing insert upper and lower surfaces and two opposing insert side surfaces which all connect the two insert end surfaces; and
 two cutting edges formed at the intersection of the insert upper surface and the two insert end surfaces, respectively; and
 a mounting projection projecting from the insert upper surface, the mounting projection comprising two insert bearing surfaces, offset in the direction of the insert longitudinal axis, and formed on the insert upper surface above a cutting edge plane, each cutting edge being associated with the insert bearing surface that is closest thereto; wherein:
  an insert median plane located between the insert upper and lower surfaces contains the insert longitudinal axis, and intersects the two opposing insert side surfaces and also the two opposing insert end surfaces;
  an insert longitudinal plane located between the opposite insert side surfaces contains the insert longitudinal axis, and intersects the opposing insert upper and lower surfaces and also the opposing insert end surfaces;

the insert lower surface comprises at least one insert lower abutment surface; and each insert bearing surface comprises:
- an insert upper abutment surface which mutually faces away from the at least one insert lower abutment surface; and
- an insert stopper surface which is closer to the associated cutting edge, and the insert lower abutment surface, than the insert upper abutment surface; wherein:

the insert upper abutment surface and the insert stopper surface slope towards the insert median plane in a direction towards the associated cutting edge, the insert stopper surface sloping more steeply than the insert upper abutment surface.

It is understood that the above-said is a summary, and that features described hereinafter may be applicable in any combination to the subject matter of the present application, for example, any of the following features may be applicable to the cutting insert, insert holder or cutting tool:

The pocket stopper surface can slope towards the pocket longitudinal plane in a direction away from the pocket front opening.

The pocket upper clamping surface can slope towards the pocket longitudinal plane in a direction away from the pocket front opening. The pocket stopper surface can slope more steeply than the pocket upper clamping surface.

The insert receiving pocket can be oriented along a transverse pocket plane which contains the pocket longitudinal axis, and which intersects the pocket upper and lower surfaces. The transverse pocket plane can be transverse to the holder longitudinal axis.

The transverse pocket plane can be perpendicular to the holder longitudinal axis.

The pocket longitudinal plane can be perpendicular to the transverse pocket plane. The pocket lower clamping surface can slope away from the pocket longitudinal plane in the rearward direction.

The pocket lower clamping surface can extend longitudinally between the first and second recess side openings in a direction parallel to the pocket longitudinal axis.

The pocket lower clamping surface can be planar.

The pocket lower clamping surface can comprise two pocket lower clamping sub-surfaces which can be co-planar and spaced apart from each other in a direction away from the pocket front opening by a lower relief recess recessed in the pocket lower surface.

The pocket upper clamping surface can be planar.

The insert receiving pocket can comprise an insertion groove recessed in the pocket upper clamping surface and extending away from the pocket front opening.

The insertion groove can extend centrally along an entire longitudinal extent of the pocket upper clamping surface so that the pocket upper clamping surface can comprise two pocket upper clamping sub-surfaces which can be co-planar and spaced apart from each other in a direction away from the holder end surface by the insertion groove.

The pocket stopper surface can be planar.

The insert receiving pocket can open out to the holder end surface.

The insert receiving pocket can extend to the second recess side opening to define a pocket rear opening opposite the pocket front opening.

The insert holder can comprise a lower support rib which protrudes from the holder peripheral surface and is located on the lower jaw adjacent the pocket front opening.

The upper jaw can be configured to resiliently clamp a cutting insert in the insert receiving pocket without the use of an additional, separate clamping device.

The insert holder can comprise a resilience slot formed in the clamping recess and extending rearwardly from the insert receiving pocket.

The resilience slot can be entirely spaced apart from the holder end surface by the insert receiving pocket.

The clamping recess can be defined by opposite recess upper and lower surfaces formed on the upper and lower jaws, respectively. The upper jaw can comprise an inner flexibility groove recessed in the recess upper surface.

The inner flexibility groove can open out to the holder end surface at an inner flexibility groove opening and can extend to beyond the insert receiving pocket in the rearward direction of the insert holder.

The pocket upper clamping surface and the pocket stopper surface can be spaced apart from each other by the inner flexibility groove.

The upper jaw can comprise an outer flexibility groove recessed in the holder peripheral surface.

The outer flexibility groove can open out to the holder end surface at an outer flexibility groove opening and can extend to beyond the insert receiving pocket in the rearward direction of the insert holder.

In a direction along the pocket longitudinal axis, the outer flexibility groove opening can be further from the pocket front opening than the pocket stopper surface.

The outer flexibility groove can be oriented parallel to the holder longitudinal axis.

The insert receiving pocket can comprise at least one pocket axial abutment surface formed on the lower jaw which delimits the insert receiving pocket in the rearward direction of the insert holder.

The at least one pocket axial abutment surface can be spaced apart from the pocket lower clamping surface.

The lower jaw can comprise two pocket axial abutment surfaces which can be spaced apart from each other in a direction away from the pocket lower clamping surface by an axial relief recess.

The shank portion and the insert mounting portion can be integrally formed together to have unitary one-piece construction.

The holder peripheral surface at the insert mounting portion can be convexly curved.

The cutting insert can be double-ended and longitudinally elongated in a direction defining an insert longitudinal axis and can comprise:
- two opposing insert end surfaces and an insert peripheral surface extending therebetween, the insert peripheral surface extending circumferentially about the insert longitudinal axis and comprising opposing insert upper and lower surfaces and two opposing insert side surfaces which all connect the two insert end surfaces; and
- two cutting edges formed at the intersection of the insert upper surface and the two insert end surfaces, respectively; and
- a mounting projection projecting from the insert upper surface, the mounting projection comprising two insert bearing surfaces, offset in the direction of the insert longitudinal axis, and formed on the insert upper surface above a cutting edge plane, each cutting edge being associated with the insert bearing surface that is closest thereto; wherein:

an insert median plane located between the insert upper and lower surfaces contains the insert longitudinal axis, and intersects the two opposing insert side surfaces and also the two opposing insert end surfaces;

an insert longitudinal plane located between the opposite insert side surfaces contains the insert longitudinal axis, and intersects the opposing insert upper and lower surfaces and also the opposing insert end surfaces;

the insert lower surface comprises at least one insert lower abutment surface;

and each insert bearing surface can comprise:
an insert upper abutment surface which mutually faces away from the at least one insert lower abutment surface; and
an insert stopper surface which is closer to the associated cutting edge, and also to the insert lower abutment surface, than the insert upper abutment surface.

Each insert stopper surface can slope towards the insert median plane in a direction towards the associated cutting edge.

Each insert upper abutment surface can slope towards the insert median plane in a direction towards the associated cutting edge. For any given insert bearing surface, the insert stopper surface can slope more steeply than the insert upper abutment surface.

The cutting insert can be resiliently clamped in the insert receiving pocket.

The cutting edge that is proximate the pocket front opening can form an active cutting edge. The pocket stopper surface can abut the insert stopper surface. The pocket lower clamping surface can abut one of the at least one insert lower abutment surfaces. The pocket upper clamping surface abuts the insert upper abutment surface that is furthest from the active cutting edge.

The insert receiving pocket can comprise at least one forwardly facing pocket axial abutment surface formed on the lower jaw for delimiting the insert receiving pocket in the rearward direction. Each insert side surface can comprise an insert side abutment surface. The at least one pocket axial abutment surface can abut one of the insert side surfaces.

The mounting projection can extend between the two insert side surfaces.

The mounting projection can be spaced apart from the two rake surfaces, in a direction along the insert longitudinal axis.

Each insert stopper surface can be planar.

Each insert upper abutment surface can be planar.

The mounting projection can comprise two projecting insertion ridges, each insertion ridge projecting from a respective insert upper abutment surface.

Each insertion ridge can extend centrally along an entire longitudinal extent of the insert upper abutment surface so that each insert upper abutment surface can comprise two parallel insert upper abutment sub-surfaces which can be co-planar and spaced apart from each other by the insertion ridge, on opposite sides of the insert longitudinal plane.

The cutting insert can have an insert central axis perpendicular to, and intersecting with, the insert longitudinal axis, and intersecting the insert upper and lower surfaces. The cutting insert can exhibit rotational symmetry about the insert central axis.

The at least one insert lower abutment surface can extend parallel to the insert longitudinal axis.

The cutting insert can be devoid of a through hole, for a retaining screw.

The at least one insert lower abutment surface can be planar.

The cutting insert can have an insert central axis perpendicular to, and intersecting with, the insert longitudinal axis, and intersecting the insert upper and lower surfaces. The insert lower surface can comprise two insert lower abutment surface which can be planar and slope towards the insert central axis in a direction away from the insert upper surface.

The mounting projection can comprise two projecting insertion ridges, each insertion ridge projecting from a respective insert upper abutment surface.

Each insert stopper surface can be planar.

BRIEF DESCRIPTION OF THE FIGURES

For a better understanding of the present application and to show how the same may be carried out in practice, reference will now be made to the accompanying drawings, in which.

Figure 1:
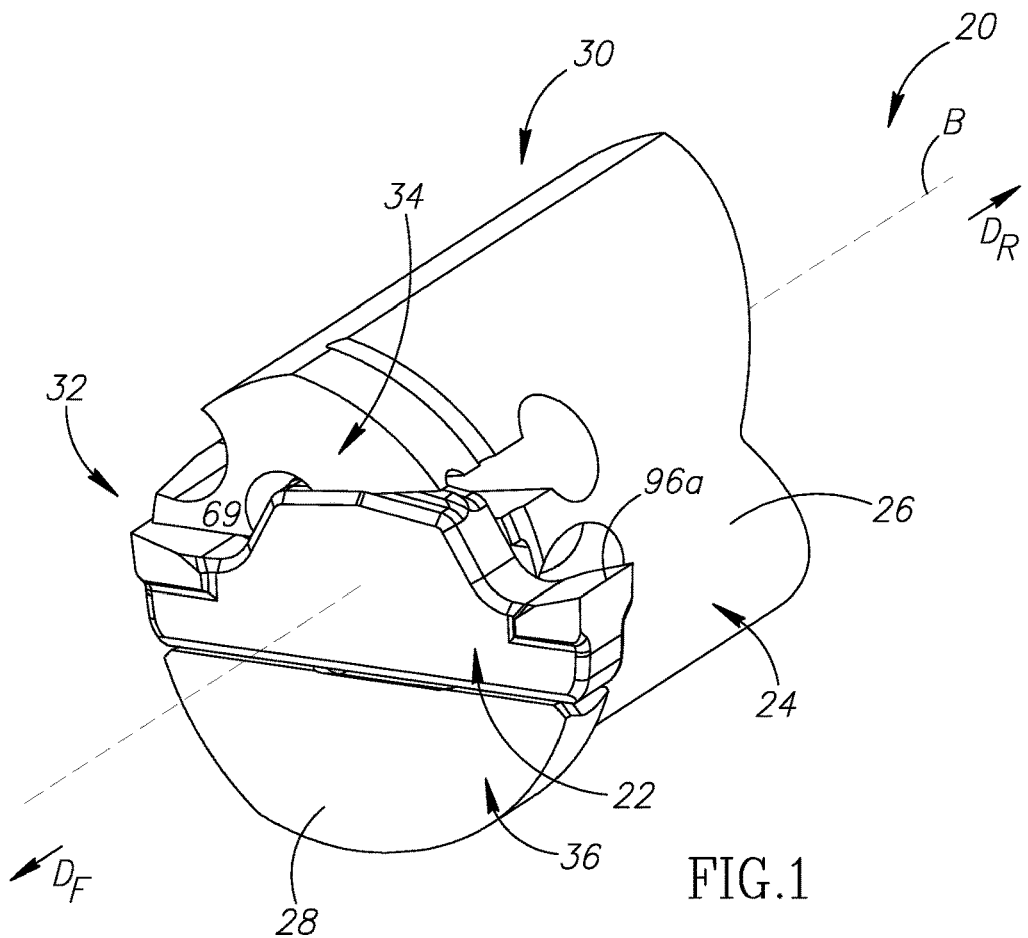
FIG. 1 is a perspective view of a cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, for chip removal, in accordance with embodiments of the subject matter of the present application. The cutting tool 20 has a cutting insert 22 which can be typically made from cemented carbide. The cutting tool 20 also has an insert holder 24 which can be typically made from steel. In this non-limiting example shown in the drawings, the cutting tool 20 is an internal grooving tool and the cutting insert 22 is a grooving insert. The cutting tool 20 is adjustable between a released and fastened position. In the fastened position of the cutting tool 20, the cutting insert 22 is releasably attached to the insert holder 24.

Attention is drawn now to FIG. 2-6 showing an insert holder 24 in accordance with the present application. The insert holder 24 is elongated along a holder longitudinal axis B that defines opposite forward to rearward direction $D_F$, $D_R$. The insert holder 24 includes a holder peripheral surface 26 that extends circumferentially along the holder longitudinal axis B. The holder peripheral surface 26 intersects, and forms a boundary of, a holder end surface 28 at a forward end of the insert holder 24. The holder longitudinal axis B can intersect the holder end surface 28. It should be appreciated that use of the terms "forward" and "rearward" throughout the description and claims refer to a relative position in a direction of the holder longitudinal axis B towards the left and right, respectively, in FIGS. 4 and 6.

Figure 3:
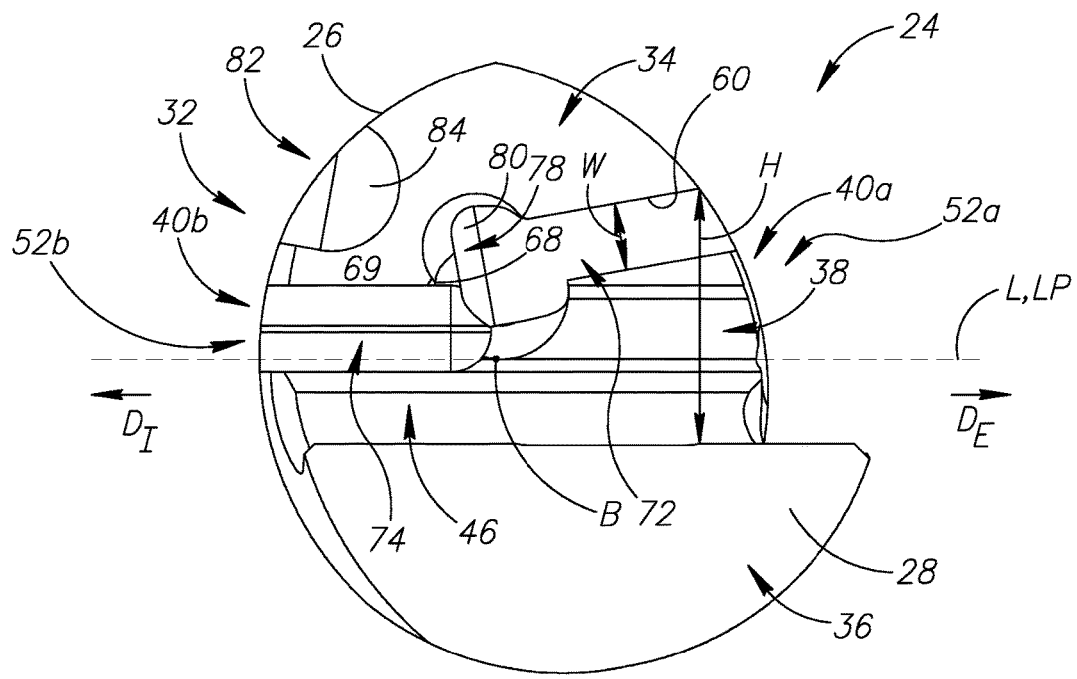
FIG. 3 is a front end view of the insert holder shown in FIG. 2.

The insert holder 24 includes a shank portion 30 and an insert mounting portion 32 located at a forward end thereof. Both the shank portion 30 and the insert mounting portion 32 are defined circumferentially by the holder peripheral surface 26. In accordance with some embodiments of the subject matter of the present application, the shank portion 30 and the insert mounting portion 32 can be integrally formed together to have unitary one-piece construction. That is to say, the tool holder is devoid of a separate adaptor of the type disclosed in U.S. Pat. No. 5,833,403. Referring to FIG. 3, the holder peripheral surface 26 at the insert mounting portion 32 can be convexly curved. In this non-limiting example shown in the drawings, the holder peripheral surface 26 can have an elliptical cross-section taken in a plane perpendicular to the holder longitudinal axis B. This aids insertion of the cutting tool 20 into round holes. The holder peripheral surface 26 at the shank portion 30 can be convexly curved. It is noted that the insert holder 24 is not in the form of a blade, as known in the art (e.g. as also disclosed in U.S. Pat. No. 9,033,622), and which are suitable for external grooving.

As seen in FIG. 3, the insert mounting portion 32 includes an upper jaw 34 and a lower jaw 36. In accordance with some embodiments of the subject matter of the present application, the upper and lower jaws 34, 36 can be integrally formed together to have unitary one-piece construction.

Figure 2:
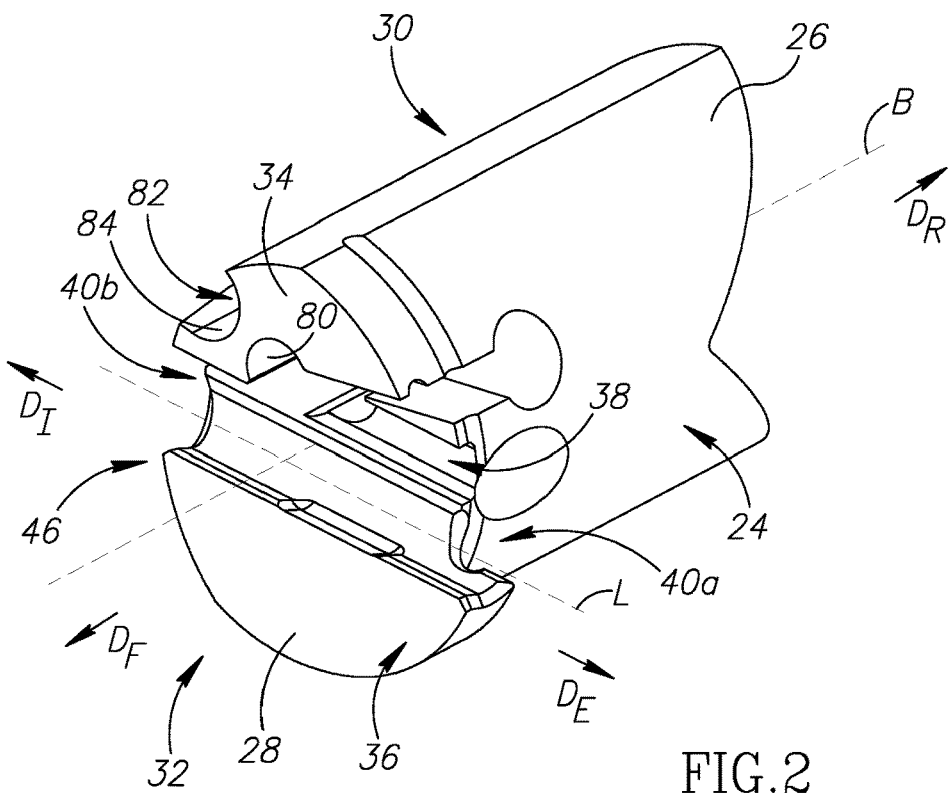
FIG. 2 is a first perspective view of an insert holder shown in FIG. 1.

Referring to FIGS. 2a to 5, the upper and lower jaws 34, 36 are spaced apart by a clamping recess 38. The clamping recess 38 is recessed in the holder end surface 28. The clamping recess 38 extends on the holder end surface 28 to two distinct portions of the holder peripheral surface 26. As seen in FIGS. 2 and 3, the clamping recess 38 includes first and second recess side openings 40a, 40b at which the clamping recess 38 opens out to the holder peripheral surface 26. Generally speaking, the first and second recess side openings 40a, 40b are on opposite sides of the holder peripheral surface 26 along a pocket longitudinal axis L. It is noted that the first and recess second side openings 40a, 40b intersect the holder end surface 28. By virtue of the foregoing configuration the insert holder 24 has a bifurcated form.

Figure 2A:
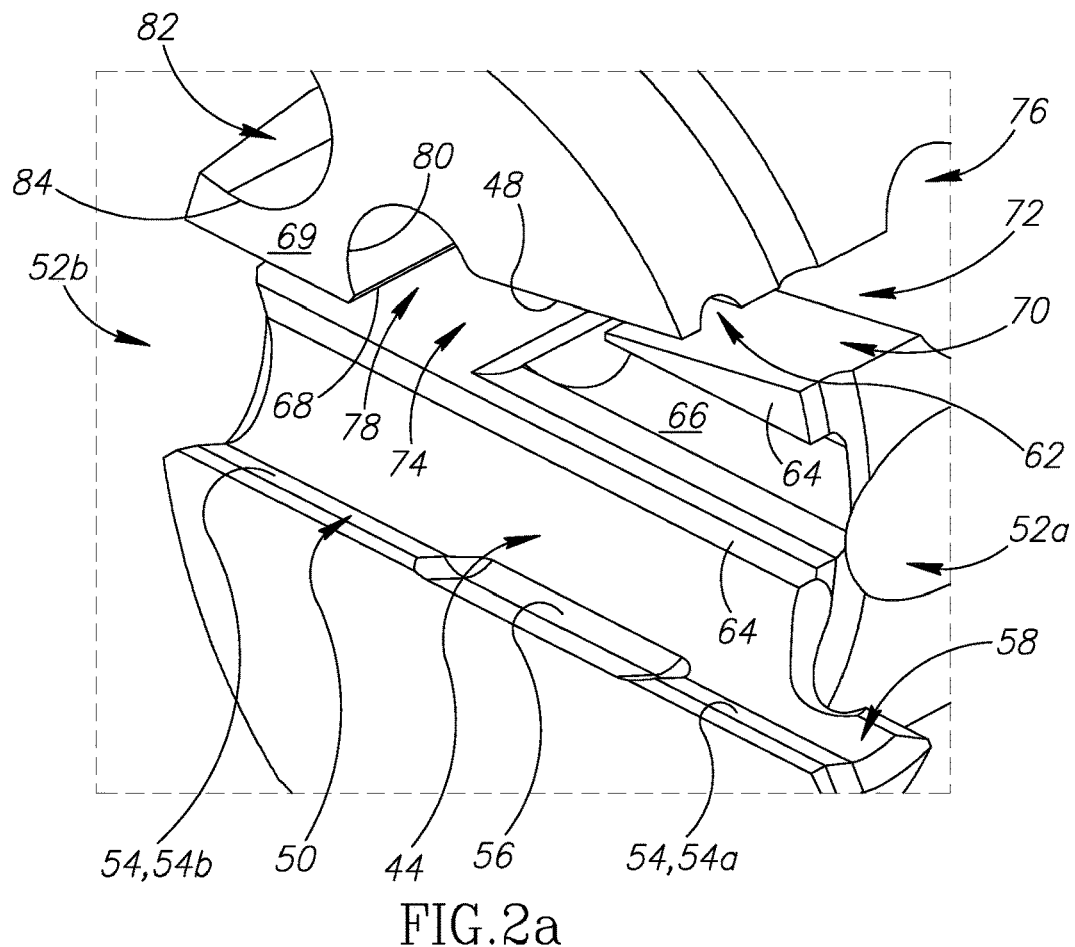
FIG. 2a is detail of FIG. 2.
Figure 2B:
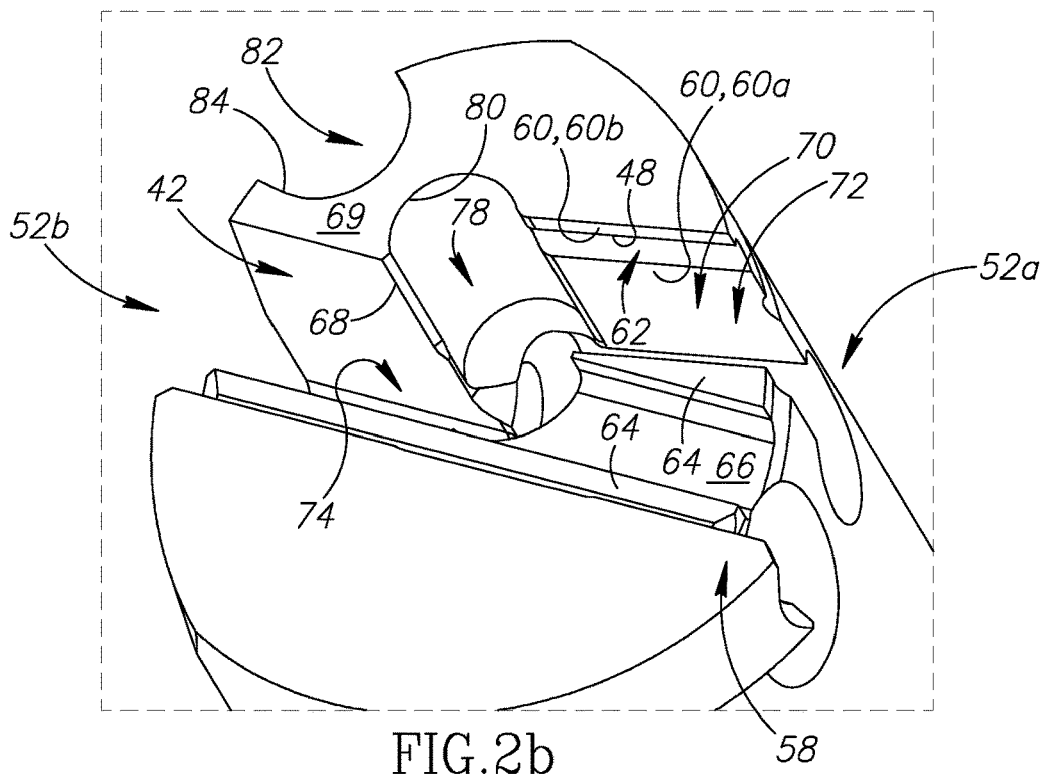
FIG. 2b is a detail of a second perspective view of the insert holder shown in FIG. 1.

Referring in particular to FIGS. 2a and 2b, in accordance with some embodiments of the subject matter of the present application, the clamping recess 38 can be defined by opposite recess upper and lower surfaces 42, 44 formed on the upper and lower jaws, respectively 34, 36. The recess upper and lower surfaces 42, 44 connect the first and second recess side openings 40a, 40b and extend to the holder end surface 28.

The upper jaw 34 is movable with respect to the lower jaw 36 by rotating around a pivot axis P. The pivot axis P is non-parallel to the holder longitudinal axis B. In accordance with some embodiments of the subject matter of the present application, the pivot axis P can be perpendicular to the holder longitudinal axis B. The upper jaw 34 can be resiliently movable with respect to the lower jaw 36. In particular, the upper jaw 34 can be configured to resiliently clamp the cutting insert 22 without the use of an additional, separate clamping device, such as a clamping screw or other fastener.

Referring to FIG. 2a, the insert mounting portion 32 includes a transversely oriented insert receiving pocket 46, which has an insert insertion direction $D_I$ that is transverse to the holder longitudinal axis B. The insert receiving pocket 46 is configured to receive a cutting insert 22 therein. The insert receiving pocket 46 is formed in the clamping recess 38. More specifically, the insert receiving pocket 46 is defined, at least partially, by pocket upper and lower surfaces 48, 50 formed on the upper and lower jaws 34, 36, respectively. Even more specifically, the pocket upper and lower surfaces 48, 50 are located on the recess upper and lower surfaces 42, 44, respectively. The insert receiving pocket 46 extends longitudinally along the pocket longitudinal axis L to the first recess side opening 40a to define a pocket front opening 52a. The pocket front opening 52a is of sufficient dimensions to allow insertion of the cutting insert 22 into the insert receiving pocket 46. The pocket longitudinal axis L passes between the pocket upper and lower surfaces 48, 50 and passes through the pocket front opening 52a. The pocket longitudinal axis L defines opposite insert insertion and extraction directions $D_I$, $D_E$. The insert receiving pocket 46 extends to the second recess side opening 40b to define a pocket rear opening 52b opposite the pocket front opening 52a. The pocket longitudinal axis L passes through the pocket rear opening 52b.

In accordance with some embodiments of the subject matter of the present application, the insert receiving pocket 46 can open out to the holder end surface 28. Stated differently, the insert receiving pocket 46 can be immediately adjacent to (i.e., adjoin) the holder end surface 28.

In accordance with some embodiments of the subject matter of the present application, the insert receiving pocket 46 can be in the basic form of a clamping slot, suitable for receiving elongated grooving inserts of the type known in the art (e.g. as disclosed in U.S. Pat. No. 5,833,403), which permit internal grooving of the workpiece to be performed. Also in some embodiments, the insert holder 24 may have only a single insert receiving pocket 46, rather than having two or more circumferentially spaced apart insert receiving pockets along its periphery, such as in a slotting cutter.

The pocket upper and lower surfaces 48, 50 can be elongated. The insert receiving pocket 46 can be oriented along a transverse pocket plane PP. The transverse pocket plane PP contains the pocket longitudinal axis L and intersects the pocket upper and lower surfaces 48, 50. The transverse pocket plane PP can be transverse to the holder longitudinal axis B. In particular, the transverse pocket plane PP can be perpendicular to the holder longitudinal axis B. The insert receiving pocket 46 has a pocket longitudinal plane LP containing the pocket longitudinal axis L and passing between the pocket upper and lower surfaces 48, 50. The pocket longitudinal plane LP can be oriented perpendicular to the transverse pocket plane PP. Also, as seen in FIG. 3, in a front view of the insert holder 24, the holder longitudinal axis B passes through the insert receiving pocket 46. In some embodiments, the holder longitudinal axis B may intersect the pocket longitudinal axis L.

The pocket lower surface 50 includes a pocket lower clamping surface 54. The pocket lower clamping surface 54 is for firmly clamping a corresponding surface on the cutting insert 22. In accordance with some embodiments of the subject matter of the present application, the pocket lower clamping surface 54 can be planar. The pocket lower clamping surface 54 can slope away from the pocket longitudinal plane LP in the rearward direction $D_R$. As seen best in FIG. 2a, the pocket lower clamping surface 54 can extend between the first and second recess side openings 40a, 40b. The pocket lower clamping surface 54 can extend longitudinally in a direction parallel to the pocket longitudinal axis L. The insert receiving pocket 46 has a maximum pocket height H at the pocket front opening 52a, as seen in an end view, measured in a direction perpendicular to the pocket longitudinal plane LP.

Referring to FIG. 2a, in accordance with some embodiments of the subject matter of the present application, the pocket lower clamping surface 54 can include two pocket lower clamping sub-surfaces 54a, 54b which are co-planar and spaced apart from each other along the pocket longitudinal axis L and in a direction away from the pocket front opening 52a, by a lower relief recess 56 recessed in the pocket lower surface 50.

Referring to FIG. 2a, in accordance with some embodiments of the subject matter of the present application, the insert holder 24 can include a lower support rib 58. The lower support rib 58 protrudes from the holder peripheral surface 26 and is located on the lower jaw 36 adjacent the pocket front opening 52a. The lower support rib 58 provides additional support to the cutting insert 22. The lower support rib 58 is narrower than the cutting insert 22 so as not to interfere during cutting operations. The pocket lower clamping surface 54 can extend onto the lower support rib 58 so as to extend further radially outward (relative to the holder axis B) than a corresponding surface on the upper the pocket upper surface 48 and thereby provide additional support against cutting forces.

Figure 4:
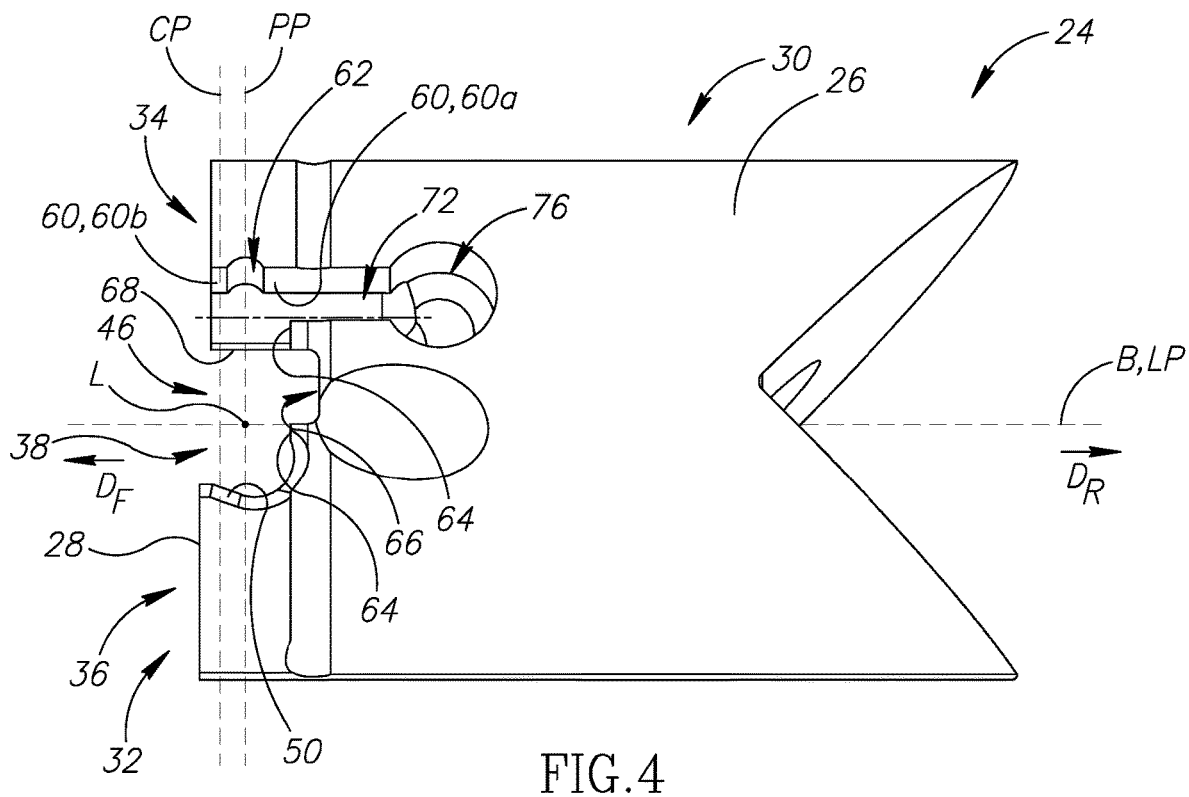
FIG. 4 is a first side view of the insert holder shown in FIG. 2.
Figure 5:
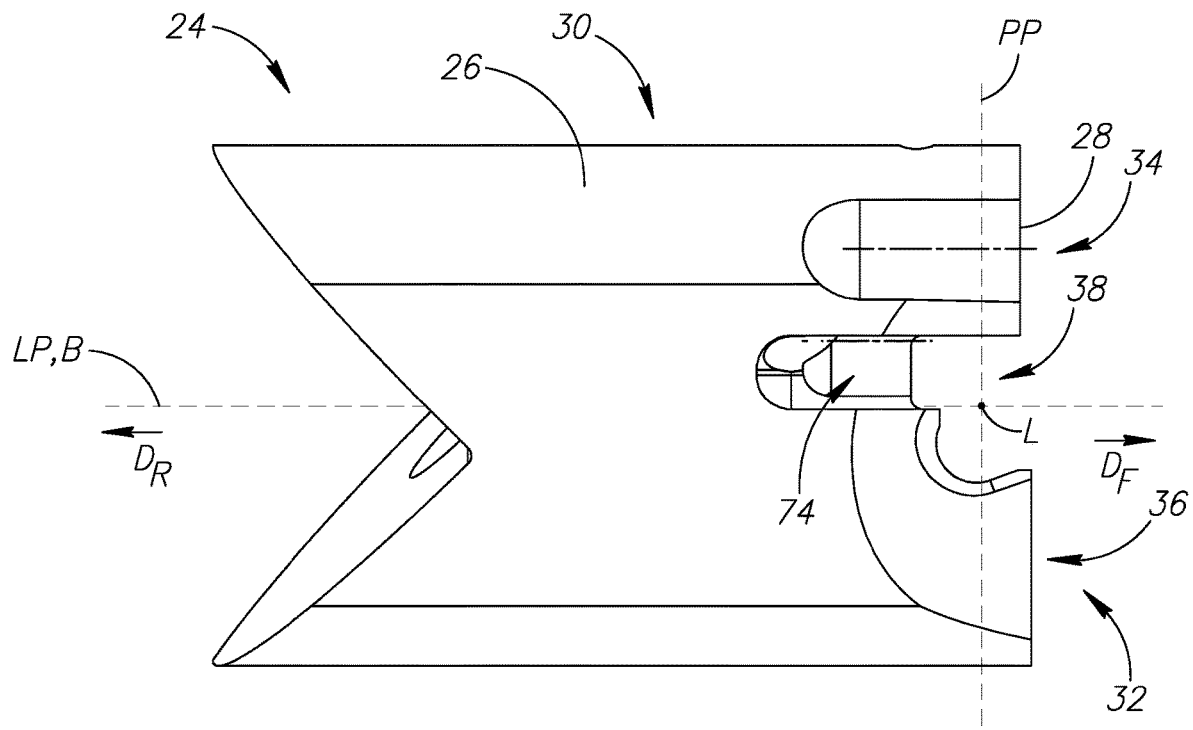
FIG. 5 is a second side view of the insert holder shown in FIG. 2.
Figure 6:
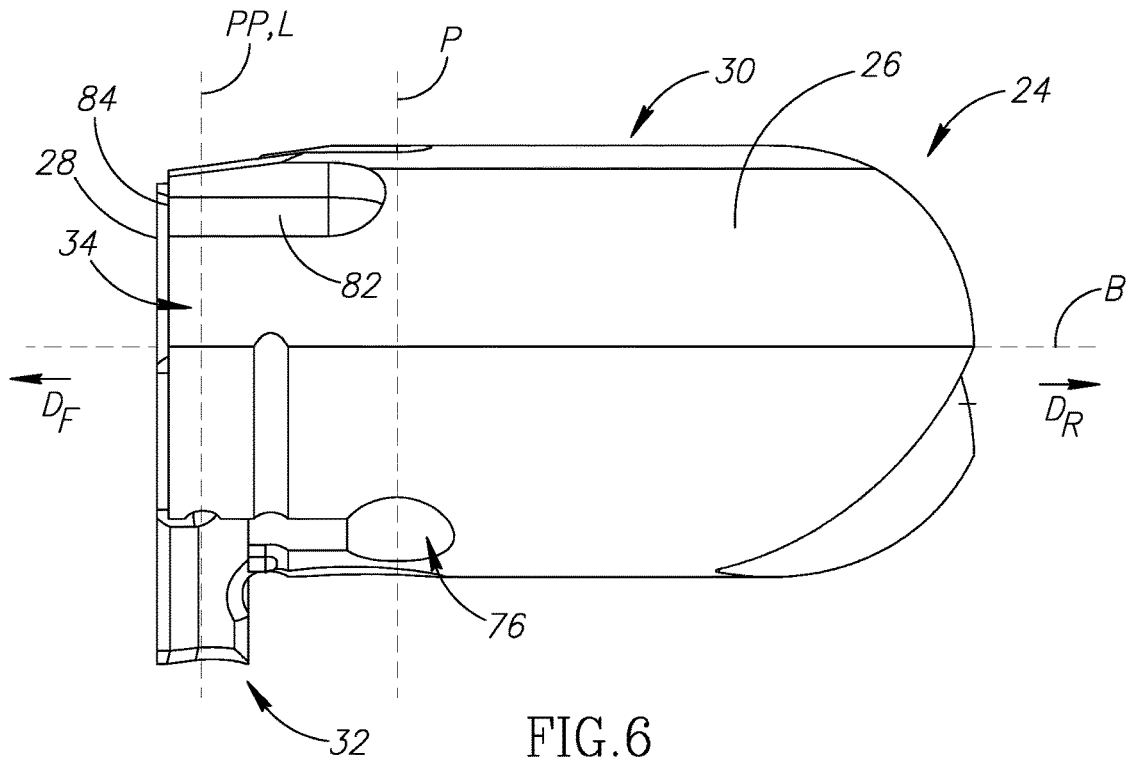
FIG. 6 is a top view of the insert holder shown in FIG. 2.
Figure 7:
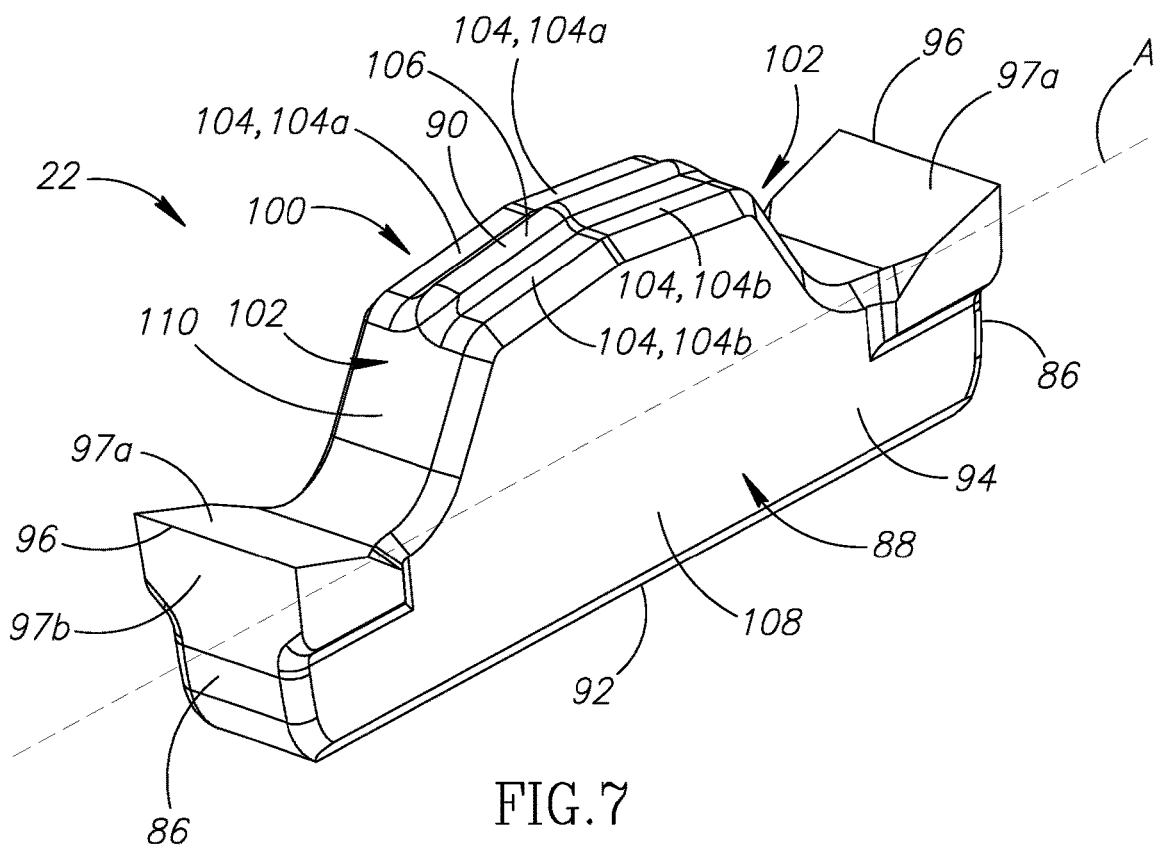
FIG. 7 is a perspective view of a cutting insert shown in FIG. 1.

The pocket upper surface 48 includes a pocket upper clamping surface 60. The pocket upper clamping surface 60 is for firmly clamping a corresponding surface the cutting insert 22. The pocket upper clamping surface 60 faces mutually towards the pocket lower clamping surface 54 (i.e. the pocket upper clamping surface 60 and the pocket lower clamping surface 54 face towards each other). In accordance with some embodiments of the subject matter of the present application, the pocket upper clamping surface 60 can be visible from a front opening view of the insert receiving pocket 46, i.e., along the pocket longitudinal axis L in front of the pocket front opening 52a (i e. FIG. 4). Reverting to FIG. 3, the pocket upper clamping surface 60 can slope towards the pocket longitudinal axis L (and also the pocket longitudinal plane LP) in a direction away from the pocket front opening 52a. The pocket upper clamping surface 60 can be planar. In a cross-sectional view taken in a clamping plane CP parallel to the transverse pocket plane PP and intersecting the upper and pocket lower clamping surfaces 54, 60 (i.e. FIG. 13), the pocket upper clamping surface 60 and the pocket lower clamping surface 54 can converge towards each other in a direction away from the pocket front opening 52a. It is noted that the insert holder 24 can be devoid of a support rib protruding from the holder peripheral surface 26 at the upper jaw 36 adjacent the pocket front opening 52a.

Referring to FIGS. 2b and 4, the insert receiving pocket 46 can include an insertion groove 62 recessed in the pocket upper clamping surface 60. The insertion groove 62 is used in the assembly of the cutting tool 20, and is described further on in the description. The insertion groove 62 can extend generally along the insertion direction $D_I$, from the pocket front opening 52a. The insertion groove 62 can extend centrally along an entire longitudinal extent of the pocket upper clamping surface 60 so that the pocket upper clamping surface 60 includes two co-planar pocket upper clamping sub-surfaces 60a, 60b which are spaced apart from each other in a direction away from the holder end surface 28 by the insertion groove 62.

Referring to FIGS. 2a and 2b, in accordance with some embodiments of the subject matter of the present application, the insert receiving pocket 46 can include at least one generally forward facing pocket axial abutment surface 64 formed on the lower jaw 36 which delimits the insert receiving pocket 46 in the rearward direction $D_R$ of the insert holder 24. The at least one pocket axial abutment surface 64 serves to prevent rearward displacement of the cutting insert 22 during metal cutting operations. In combination with the sloping pocket lower clamping surface 54, it can also provide a wedge-like lower seating for the cutting insert 22. The at least one pocket axial abutment surface 64 can be spaced apart from the pocket lower clamping surface 54. The lower jaw 36 can include two pocket axial abutment surfaces 64 which are spaced apart from each other in a direction away from the pocket lower clamping surface 54 by an axial relief recess 66. The two pocket axial abutment surfaces 64 may be located on opposite sides of the pocket longitudinal plane LP. The pocket axial abutment surface 64 that is closest to the pocket lower clamping surface 54 can extend longitudinally in a direction parallel to the pocket longitudinal axis L between the first and second recess side openings 40a, 40b.

The pocket upper surface 48 includes a pocket stopper surface 68. The pocket stopper surface 68 is for positioning the cutting insert 22 in a predefined position when inserting the cutting insert 22 into the insert receiving pocket 46. It also serves to prevent inward displacement of the cutting insert 22 further into the insert receiving pocket 46 along the pocket longitudinal axis L during metal cutting operations.

The pocket stopper surface 68 faces generally towards the pocket front opening 52a in order to serve as a stopper. The upper jaw 34 includes a stopper support portion 69 located behind the pocket stopper surface 68 (i.e. further from the pocket front opening 52a than the pocket stopper surface 68). The pocket stopper surface 68 is formed on the stopper support portion 69. The pocket stopper surface 68 is closer to the pocket lower clamping surface 54 than the pocket upper clamping surface 60. The pocket stopper surface 68 is further from pocket front opening 52a than the pocket upper clamping surface 60. The pocket lower clamping surface 54 extends along the pocket longitudinal axis L, closer to the pocket rear opening 52b than the pocket stopper surface 68. Thus, the stopper support portion 69 does not affect the radial dimension of the cutting tool. Typically, this allows internal cutting operations in holes having a diameter in the order of 5 mm. The pocket stopper surface 68 is visible in the front opening view of the insert receiving pocket 46. In accordance with some embodiments of the subject matter of the present application, the pocket stopper surface 68 can slope towards the pocket longitudinal axis L (and also the pocket longitudinal plane LP) in a direction away from the pocket front opening 52*a*. As seen in FIG. 3, in a front end view of the insert holder 24, the pocket stopper surface 68 can slope more steeply towards the pocket longitudinal plane LP in a direction away from the pocket front opening 52*a* than the pocket upper clamping surface 60. The pocket stopper surface 68 can be planar. Similar to the pocket upper clamping surface 60, the pocket stopper surface 68 and the pocket lower clamping surface 54 can converge towards each other in a direction away from the pocket front opening 52*a*.

Referring to FIGS. 2*a* and 2*b*, in accordance with some embodiments of the subject matter of the present application, the insert holder 24 can include a resilience slot 70 formed in the clamping recess 38. The insert resilience slot 70 is primarily designed to provide the desired flexibility to the upper jaw 34. The upper jaw 34 should be flexible enough to allow insertion of the cutting insert 22 into the insert receiving pocket 46. At the same time, in the configuration where the cutting insert 22 is resiliently clamped, the upper jaw 34 should be rigid enough to provide sufficient clamping of the cutting insert 22.

In accordance with some embodiments of the subject matter of the present application, the resilience slot 70 extends rearwardly from the insert receiving pocket 46. Thus, the resilience slot 70 merges with the insert receiving pocket 46. The resilience slot 70 has a maximum slot width W, as seen in a front end view of the insert holder 24 (i.e. FIG. 3), measured in a direction perpendicular to the recess upper and lower surfaces 42, 44 44 at the resilience slot 70. The maximum slot width W can be less than the maximum pocket height H. Thus, the resilience slot 70 is narrower than the insert receiving pocket 46.

In accordance with some embodiments of the subject matter of the present application, the resilience slot 70 can be entirely spaced apart from the holder end surface 28 by the insert receiving pocket 46. That is to say, the resilience slot 70 does not extend to the holder end surface 28 even though portions of the recess upper and/or lower surfaces 42, 44 may be smoothly continuous where the resilience slot 70 and the insert receiving pocket 46 merge with each other. In this non-limiting example shown in the drawings (e.g. see FIG. 2*b*), the recess upper surface 42 may be smoothly continuous where the insert receiving pocket 46 intersects the resilience slot 70.

Referring to FIGS. 2*a* to 3, in accordance with some embodiments of the subject matter of the present application, the resilience slot 70 can include a first slot portion 72 and a second slot portion 74, the first slot portion 72 being adjacent the first recess side opening 40*a* and the second slot portion 74 being adjacent the second recess side opening 40*b*. The first and second slot portions 72, 74 can merge with each other. The first slot portion 72 can include a slot stress relief groove 76 where the resilience slot 70 terminates in the rearward direction $D_R$. The slot stress relief groove 76 can extend along the pivot axis P. The second slot portion 74 can be devoid of a stress relief groove. The first and second slot portions 72, 74 can extend in different planes.

Referring to FIGS. 2*a*-2*b*, in accordance with some embodiments of the subject matter of the present application, the upper jaw 34 can include an inner flexibility groove 78 recessed in the recess upper surface 42. The inner flexibility groove 78 is designed to provide the desired flexibility to the upper jaw 34. It is also designed so that the pocket stopper surface 68 is not displaced (i.e. remains in the predefined position) during insertion of the cutting insert 22 into the insert receiving pocket 46. Finally, the inner flexibility groove 78 also provides a clearance gap for avoiding contact with any port of the cutting insert 22. As seen in FIG. 3, the inner flexibility groove 78 can open out to the holder end surface 28 at an inner flexibility groove opening 80. Referring to FIG. 2*b*, the inner flexibility groove 78 can extend to beyond the insert receiving pocket 46 in the rearward direction $D_R$ of the insert holder 24. The inner flexibility groove 78 can be oriented parallel to the holder longitudinal axis B. The inner flexibility groove 78 can extend to the slot stress relief groove 76. The pocket upper clamping surface 60 and the pocket stopper surface 68 can be spaced apart from each other by the inner flexibility groove 78. The pocket stopper surface 68 may not be formed in the inner flexibility groove 78.

In accordance with some embodiments of the subject matter of the present application, the upper jaw 34 can include an outer flexibility groove 82 recessed in the holder peripheral surface 26. Similar to the inner flexibility groove 78, the outer flexibility groove 82 is designed to provide the desired flexibility and rigidity to the upper jaw 34. The outer flexibility groove 82 can open out to the holder end surface 28 at an outer flexibility groove opening 84. The outer flexibility groove 82 can extend to beyond the insert receiving pocket 46 in the rearward direction $D_R$ of the insert holder 24. The outer flexibility groove 82 can be oriented parallel to the holder longitudinal axis B. In a direction along the pocket longitudinal axis L, the outer flexibility groove opening 84 can be further from the pocket front opening 52*a* than the pocket stopper surface 68.

Reference is now made to FIGS. 7 to 11, showing the cutting insert 22, in accordance with the subject matter of a second aspect of the present application. The cutting insert 22 is integrally formed to have a unitary one-piece construction. The cutting insert 22 includes two opposing insert end surfaces 86 and an insert peripheral surface 88 extending between the two insert end surfaces 86. The insert peripheral surface 88 extends circumferentially about an insert longitudinal axis A. The insert longitudinal axis A defines a length direction of the insert, i.e., the direction in which the cutting insert 22 is longitudinally elongated and has is longest dimension. The insert peripheral surface 88 includes opposing insert upper and lower surfaces 90, 92 and two opposing insert side surfaces 94 all connecting the two insert end surfaces 86. In accordance with some embodiments of the subject matter of the present application, the cutting insert 22 can be devoid of a through hole, for a retaining screw.

The cutting insert 22 includes two cutting edges 96 formed at the intersection of the insert upper surface 90 and the two insert end surfaces 86, respectively. Stated differently, the cutting insert 22 is double-ended and is two-way indexable. A portion of the insert upper surface 90 adjacent each cutting edge 96 serves as a rake surface 97*a*. A portion of each insert end surface 86 adjacent a respective cutting edge 96 serves as a relief surface 97*b*.

The insert longitudinal axis A intersects the insert end surfaces 86 and passes between the insert upper and lower surfaces 90, 92 and the insert side surfaces 94. An insert median plane MP located between the insert upper and lower surface 90, 92 contains the insert longitudinal axis A and intersects the two opposing insert side surfaces 94 and also the two opposing insert end surfaces 86. The insert longitudinal axis A and the insert median plane MP may be located midway between the insert upper and lower surfaces 90, 92.

The cutting insert 22 has an insert central (vertical) axis F perpendicular to, and intersecting with, the insert longitudinal axis A, and intersecting the insert upper and lower surfaces 90, 92. The insert central axis F is located midway between the insert end surfaces 86 and extends along a height direction of the insert, thereby establishing an upward-to-downward direction of the insert. An insert longitudinal plane IP located between the insert side surfaces 94, contains both the insert longitudinal axis A and the insert central axis F, and intersects the insert upper and lower surface 90, 92 and also the two opposing insert end surfaces 86. In accordance with some embodiments of the subject matter of the present application, the cutting insert 22 can exhibit mirror symmetry about the insert longitudinal plane IP.

The cutting insert 22 has a cutting edge plane EP which is perpendicular to the insert central axis F and which is defined by the uppermost portions of the two cutting edges 96. In some embodiments of the insert, the two cutting edges 96 may be contained in the cutting edge plane EP.

The cutting insert 22 has an insert lateral axis G perpendicular to, and intersecting with, the insert longitudinal axis A and the insert central axis F. The insert lateral axis G extends in a width direction of the insert. In accordance with some embodiments of the subject matter of the present application, the cutting insert 22 can exhibit 180° rotational symmetry about the insert central axis F. The insert longitudinal axis A and the insert lateral axis G may define the insert median plane MP. An insert transverse plane GP located between the insert end surfaces 86 contains both the insert lateral axis G and the insert central axis F, and intersects the insert upper and lower surfaces 90, 92 and also the two opposing insert side surfaces 94. In accordance with some embodiments of the subject matter of the present application, the cutting insert 22 can exhibit mirror symmetry about the insert transverse plane GP.

The insert lower surface 92 includes at least one insert lower abutment surface 98. In accordance with some embodiments of the subject matter of the present application, the at least one insert lower abutment surface 98 can extend parallel to the insert longitudinal axis A. The insert lower surface 92 can include a single insert lower abutment surface 98 which is planar (not shown). In accordance with some other embodiments of the subject matter of the present application, the insert lower surface 92 can include two insert lower abutment surfaces 98 which are planar and slope towards the insert central axis F (and thus the insert longitudinal plane IP) in a direction away from the insert upper surface 90.

The cutting insert 22 includes a mounting projection 100 projecting from the insert upper surface 90. In accordance with some embodiments of the subject matter of the present application, the mounting projection 100 can extend between the two insert side surfaces 94, in the width direction of the insert. The mounting projection 100 can be spaced apart from the two rake surfaces 97a, in a direction along the insert longitudinal axis A.

The mounting projection 100 includes two insert bearing surfaces 102. The two insert bearing surfaces 102 are formed on the insert upper surface 90 on the side of the cutting edge plane EP opposite the insert lower surface 92. Stated differently, the two insert bearing surfaces 102 are formed on the insert upper surface 90 above the cutting edge plane EP.

The two insert bearing surfaces 102 are located on opposite sides of the insert transverse plane GP, and thus can be considered offset in the direction of the insert longitudinal axis A. Each cutting edge 96 is associated with the insert bearing surface 102 that is closest thereto. In accordance with some embodiments of the subject matter of the present application, the two insert bearing surfaces 102 can be located on opposite axial sides of the mounting projection 100.

Each insert bearing surface 102 includes an insert upper abutment surface 104. The insert upper abutment surface 104 is for abutting a corresponding surface in the insert receiving pocket 46. The two insert upper abutment surfaces 104 face mutually away from the at least one insert lower abutment surface 98 (stated differently, the insert upper abutment surface 104 and the at least one insert lower abutment surface 98 face away from each other).

In accordance with some embodiments of the subject matter of the present application, each insert upper abutment surface 104 can be planar. Each insert upper abutment surface 104 can be parallel to the insert lateral axis G. The two insert upper abutment surfaces 104 can be adjacent each other.

In accordance with some embodiments of the subject matter of the present application, for any given insert bearing surface 102, the insert upper abutment surface 104 can slope towards the insert longitudinal axis A in a direction towards the associated cutting edge 96, i.e., it slopes towards the insert median plane MP. The insert upper abutment surface 104 can be visible from an end view of the cutting insert 22 along the insert longitudinal axis A in front of the associated cutting edge 96.

In accordance with some other embodiments of the subject matter of the present application, the two insert upper abutment surface 104 can be smoothly continuous with each other and parallel to the insert longitudinal axis A so as to form a single continuous insert upper abutment surface 104 extending on both sides of the insert transverse plane GP (not shown). In such a configuration, the insert upper abutment surface 104 is not visible from an end view of the cutting insert 22.

Figure 10:
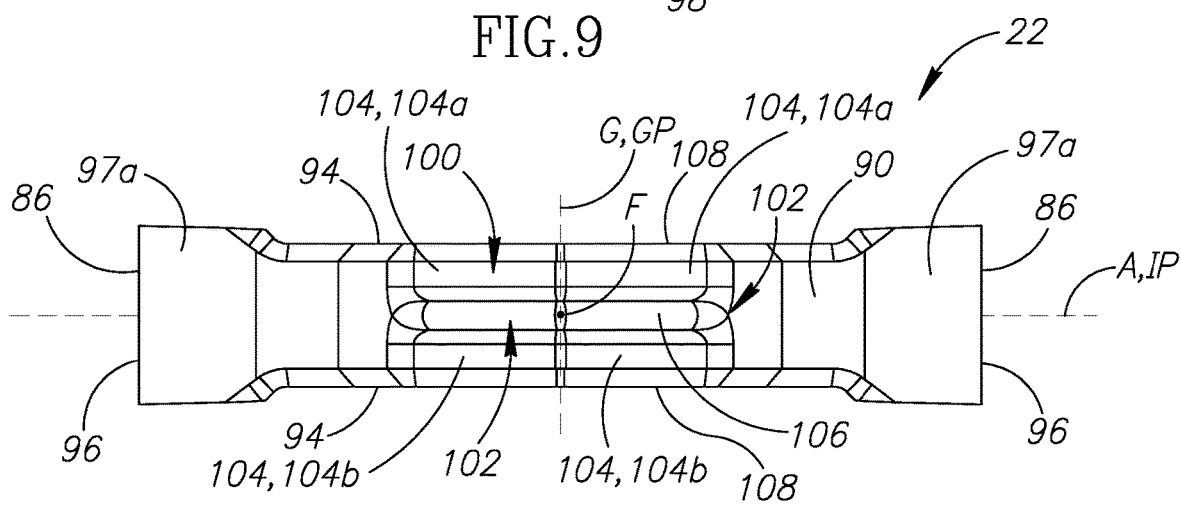
FIG. 10 is a top view of the cutting insert shown in FIG. 7.
Figure 11:
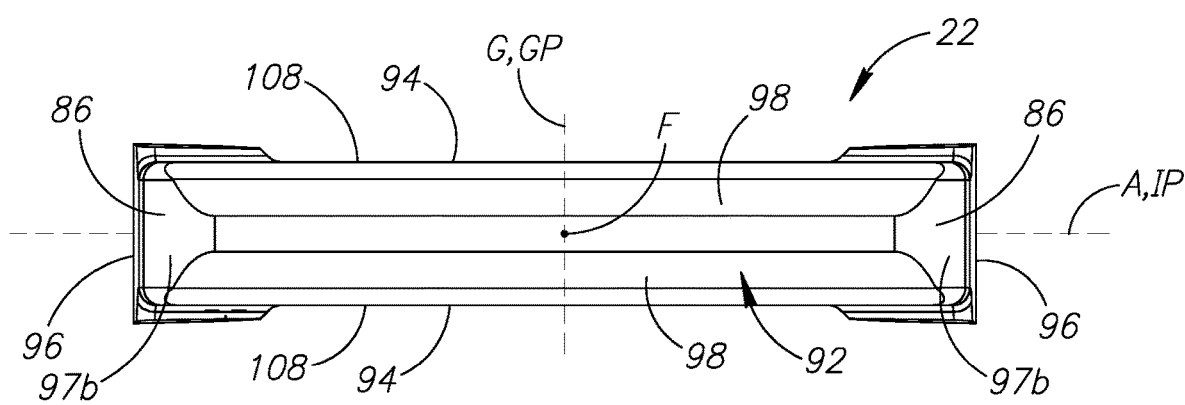
FIG. 11 is a bottom view of the cutting insert shown in FIG. 7.

In accordance with some embodiments of the subject matter of the present application, the mounting projection 100 can include two projecting insertion ridges 106. The insertion ridges 106 are designed to be positioned in the insertion groove 62 when inserting the cutting insert 22 in the insert receiving pocket 46, in the insertion direction $D_I$ towards the pocket rear opening 52b. By virtue of such, initial alignment of the cutting insert 22 with the insert receiving pocket 46 is made easier, and accidental falling of the cutting insert 22 from the insert receiving pocket 46, in the forward direction, is prevented. Each insertion ridge 106 can project from a respective insert upper abutment surface 104. Referring to FIG. 10, each insertion ridge 106 can extend centrally along an entire longitudinal extent of the insert upper abutment surface 104 so that each insert upper abutment surface 104 can include two parallel insert upper abutment sub-surfaces 104a, 104b which can be co-planar and spaced apart from each other by the insertion ridge 106, on opposite sides of the insert longitudinal plane IP.

In accordance with some embodiments of the subject matter of the present application, each insert side surface 94 can include an insert side abutment surface 108.

Figure 8:
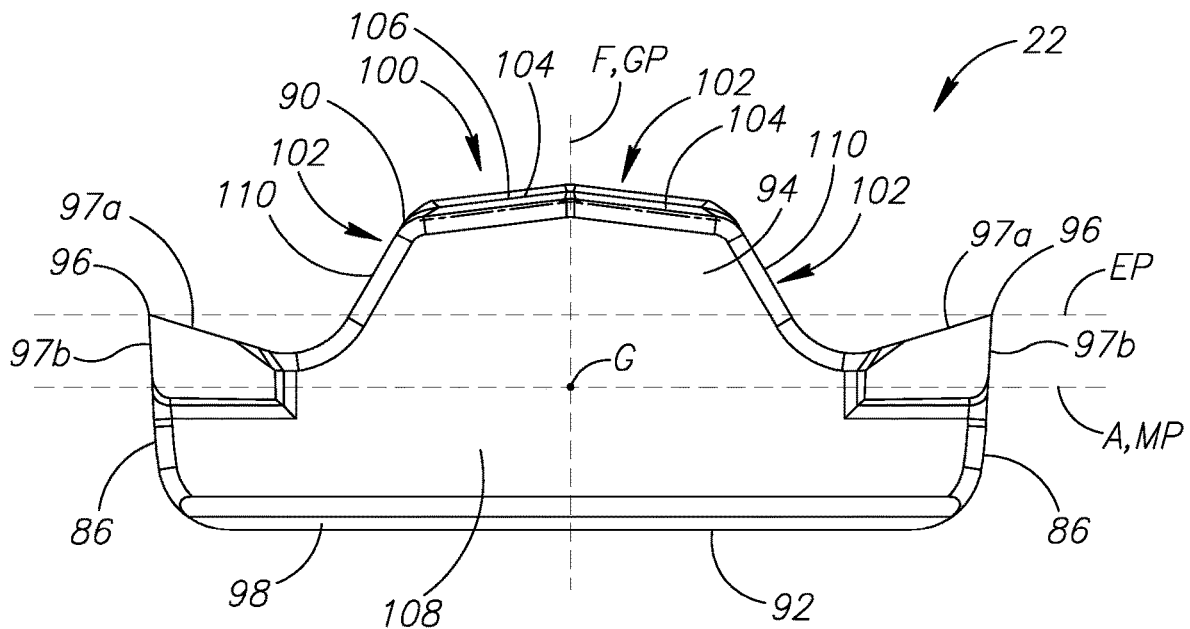
FIG. 8 is a side view of the cutting insert shown in FIG. 7.
Figure 9:
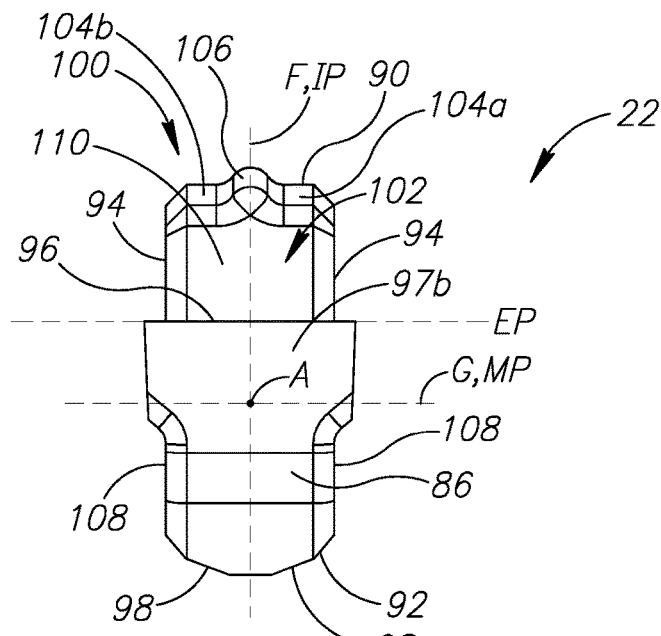
FIG. 9 is an end view of a cutting insert shown in FIG. 7.

Each insert bearing surface 102 also includes an insert stopper surface 110. The insert stopper surface 110 is for abutting a corresponding surface in the insert receiving pocket 46. For any given insert bearing surface 102, the insert stopper surface 110 is closer to the associated cutting edge % than the insert upper abutment surface 104. Each insert stopper surface 110 is visible from an end view of the cutting insert 22. In accordance with some embodiments of the subject matter of the present application, for any given insert bearing surface 102, the insert stopper surface 110 can slope towards the insert longitudinal axis A (and thus towards the insert median plane MP) in a direction towards the associated cutting edge %. As shown in FIG. 8, the insert stopper surface 110 can slope more steeply, towards the insert median plane MP in a direction towards the associated cutting edge 96, than the insert upper abutment surface 104. Each insert stopper surface 110 can be planar. Each insert stopper surface 110 can be parallel to the insert lateral axis G.

Figure 12:
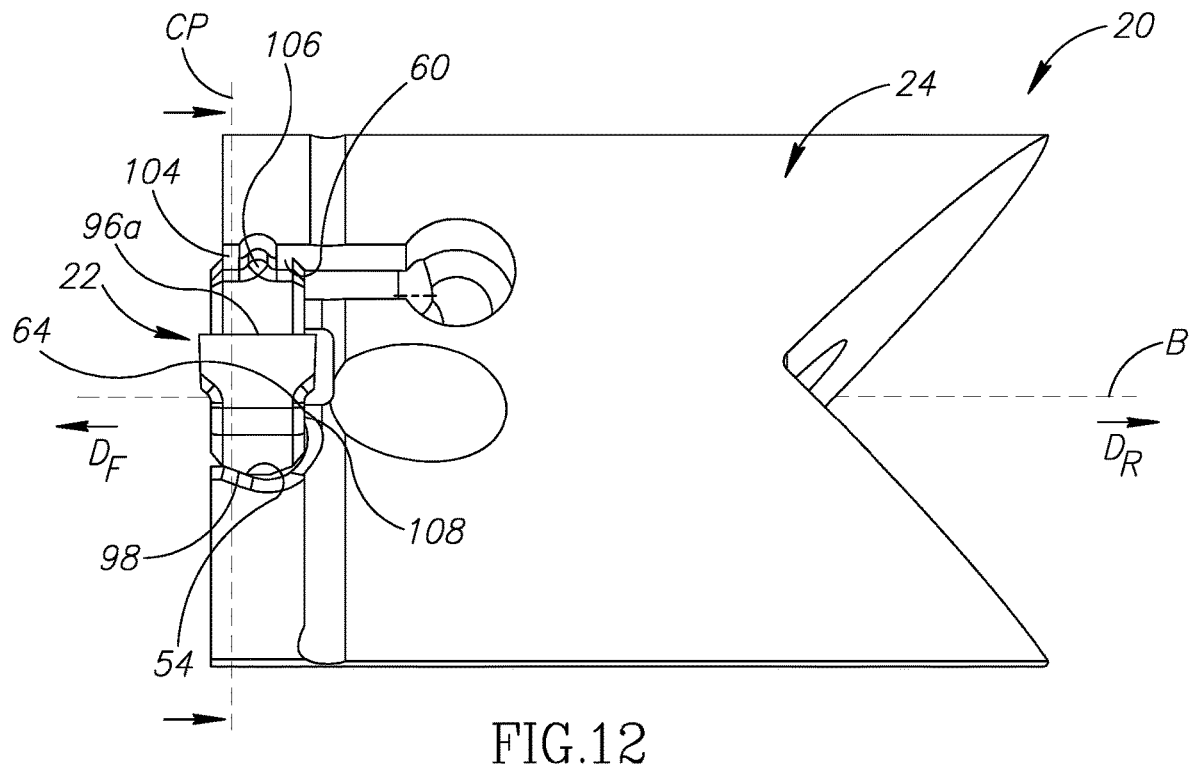
FIG. 12 is a side view of the cutting tool shown in FIG. 1.
Figure 13:
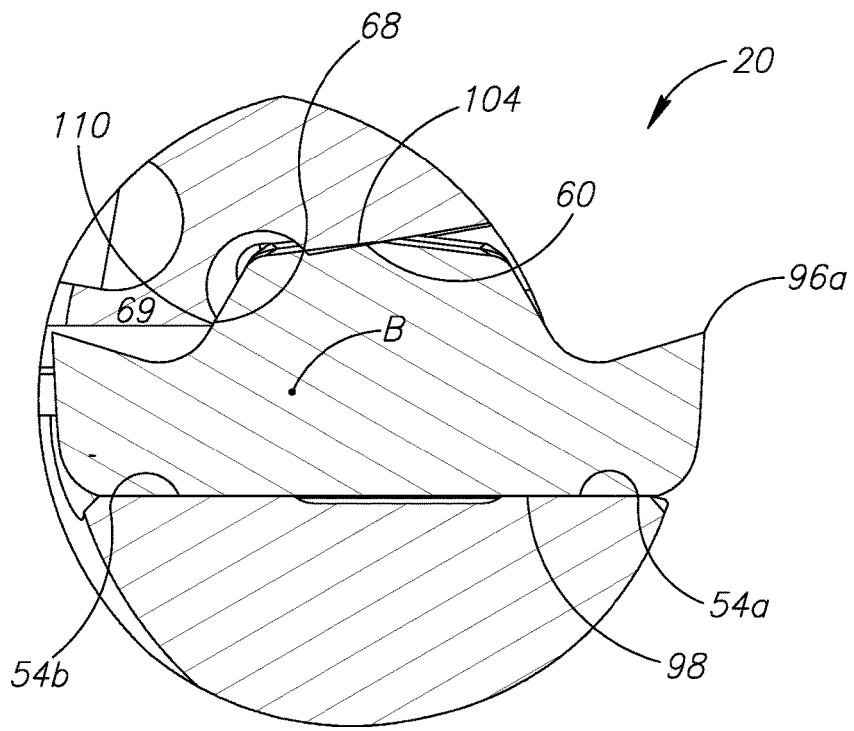
FIG. 13 is a cross section view taken in a clamping plane shown in FIG. 12.

Reference is now made to FIGS. 12 to 13, showing the cutting tool 20, in accordance with the subject matter of a third aspect of the present application. The cutting tool 20 includes the cutting insert 22 releasably clamped in the insert receiving pocket 46 of the insert holder 24. In accordance with some embodiments of the subject matter of the present application, the cutting insert 22 can be resiliently clamped in the insert receiving pocket 46. The cutting edge 96 that is outermost (and proximate the pocket front opening 52a) forms an active cutting edge 96a.

In accordance with some embodiments of the subject matter of the present application, the pocket stopper surface 68 can abut the insert stopper surface 110. The pocket lower clamping surface 54 can abut one of the at least one insert lower abutment surfaces 98. The pocket upper clamping surface 60 can abut the insert upper abutment surface 104 that is furthest from the active cutting edge 96a, i.e., the insert upper abutment surface 104 on the other side of the insert lateral plane GP. The at least one pocket axial abutment surface 64 can abut one of the insert side abutment surfaces 108. It is noted that one of the insertion ridges 106 can be located in the insertion groove 62. However, though located in the insertion groove 62, said one insertion ridge 106 can be spaced apart from the insertion groove 62, i.e., not actually contact the insertion groove 62.

One feature of the subject matter of the present application is that the pocket stopper surface 68 is located on the upper jaw 34 and does not abut a rearward portion of the cutting insert 22.

Although the subject matter of the present application has been described to a certain degree of particularity, it should be understood that various alterations and modifications could be made without departing from the spirit or scope of the invention as hereinafter claimed.

What is claimed is:

1. A double-ended cutting insert (22), longitudinally elongated in a direction defining an insert longitudinal axis (A), comprising:
   two opposing insert end surfaces (86) and an insert peripheral surface (88) extending therebetween, the insert peripheral surface (88) extending circumferentially about the insert longitudinal axis (A) and comprising opposing insert upper and lower surfaces (90, 92) and two opposing insert side surfaces (94) which all connect the two insert end surfaces (86);
   two cutting edges (96) formed at the intersection of the insert upper surface (90) and the two insert end surfaces (86), respectively; and
   a mounting projection (100) projecting from the insert upper surface (90), the mounting projection (100) comprising two insert bearing surfaces (102), offset in the direction of the insert longitudinal axis (A), and formed on the insert upper surface (90) above a cutting edge plane (EP), each cutting edge (96) being associated with the insert bearing surface (102) that is closest thereto; wherein:
   an insert median plane (MP) located between the insert upper and lower surfaces (90, 92) contains the insert longitudinal axis (A), and intersects the two opposing insert side surfaces (94) and also the two opposing insert end surfaces (86);
   an insert longitudinal plane (IP) located between the opposite insert side surfaces (94) contains the insert longitudinal axis (A), and intersects the opposing insert upper and lower surfaces (90, 92) and also the opposing insert end surfaces (86);
   the insert lower surface (92) comprises at least one insert lower abutment surface (98); and
   each insert bearing surface (102) comprises:
      an insert upper abutment surface (104) which mutually faces away from the at least one insert lower abutment surface (98); and
      an insert stopper surface (110) which is closer to the associated cutting edge (96), and the insert lower abutment surface (98), than the insert upper abutment surface (104); wherein:
         the insert upper abutment surface (104) and the insert stopper surface (110) adjoin each other, and
         the insert upper abutment surface (104) and the insert stopper surface (110) slope towards the insert median plane (MP) in a direction towards the associated cutting edge (96), the insert stopper surface (110) sloping more steeply than the insert upper abutment surface (104).

2. The cutting insert (22), according to claim 1, wherein the mounting projection (100) comprises two projecting insertion ridges (106), each insertion ridge (106) projecting from a respective insert upper abutment surface (104).

3. The cutting insert (22), according to claim 2, wherein each insertion ridge (106) extends centrally along an entire longitudinal extent of the insert upper abutment surface (104) so that each insert upper abutment surface (104) comprises two parallel insert upper abutment sub-surfaces (104a, 104b) which are co-planar and spaced apart from each other by the insertion ridge (106), on opposite sides of the insert longitudinal plane (IP).

4. The cutting insert (22), according to claim 1, wherein:
   the insert upper abutment surface (104) is further from the cutting edge plane (EP) than the insert stopper surface (110); and
   the insert upper abutment surface (104) is visible from an end view of the cutting insert (22) along the insert longitudinal axis (A) in front of the associated cutting edge (96).

5. The cutting insert (22), according to claim 4, further comprising:
   an insert central axis (F) perpendicular to and intersecting the longitudinal axis (A), the insert central axis (F) being located midway between the two insert end surfaces (86) and extending along a height direction of the insert; wherein:
   the cutting insert exhibits 180° rotational symmetry about the insert central axis (F); and
   in both a side view and an end view of the cutting insert, the highest portion of the mounting projection (100) is at the insert central axis (F).

6. A double-ended cutting insert (22), longitudinally elongated in a direction defining an insert longitudinal axis (A), comprising:
- two opposing insert end surfaces (86) and an insert peripheral surface (88) extending therebetween, the insert peripheral surface (88) extending circumferentially about the insert longitudinal axis (A) and comprising opposing insert upper and lower surfaces (90, 92) and two opposing insert side surfaces (94) which all connect the two insert end surfaces (86);
- two cutting edges (96) formed at the intersection of the insert upper surface (90) and the two insert end surfaces (86), respectively; and
- a mounting projection (100) projecting from the insert upper surface (90) the mounting projection (100) comprising two insert bearing surfaces (102), offset in the direction of the insert longitudinal axis (A), and formed on the insert upper surface (90) above a cutting edge plane (EP), each rutting edge (96) being associated with the insert bearing surface (102) that is closest thereto; wherein:
    - an insert median plane (MP) located between the insert upper and lower surfaces (90, 92) contains the insert longitudinal axis (A), and intersects the two opposing insert side surfaces (94) and also the two opposing insert end surfaces (86);
    - an insert longitudinal plane (IP) located between the opposite insert side surfaces (94) contains the insert longitudinal axis (A), and intersects the opposing insert upper and lower surfaces (90, 92) and also the opposing insert end surfaces (86);
    - the insert lower surface (92) comprises at least one insert lower abutment surface (98); and
    - each insect bearing surface (102) comprises:
        - an insert upper abutment surface (104) which mutually faces away from the at least one insert lower abutment surface (98); and
        - an insert stopper surface (110) which is closer to the associated cutting edge (96), and the insert lower abutment surface (98), than the insert upper abutment surface (104): wherein:
            - the insert upper abutment surface (104) is further from the cutting edge plane (EP) than the insert stopper surface (110); and
            - the insert upper abutment surface (104) and the insert stopper surface (110) slope towards the insert median plane (MP) in a direction towards the associated cutting edge (96), the insert stopper surface (110) sloping more steeply than the insert upper abutment surface (104).

7. The cutting insert (22), according to claim 6, wherein the insert upper abutment surface (104) and the insert stopper surface (110) adjoin each other.

8. A double-ended cutting insert (22), longitudinally elongated in a direction defining an insert longitudinal axis (A), comprising:
- two opposing insert end surfaces (86) and an insert peripheral surface (88) extending therebetween, the insert peripheral surface (88) extending circumferentially about the insert longitudinal axis (A) and comprising opposing insert upper and lower surfaces (90, 92) and two opposing insert side surfaces (94) which all connect the two insert end surfaces (86);
- two cutting edges (96) formed at the intersection of the insert upper surface (90) and the two insert end surfaces (86), respectively; and
- a mounting projection (100) comprising two insert bearing surfaces (102), offset in the direction of the insert longitudinal axis (A) and formed on the insert upper surface (90) above a cutting edge plane (EP), each cutting edge (96) being associated with the insert bearing surface (102) that is closest thereto wherein:
    - an insert median plane (MP) located between the insert upper and lower surfaces (90, 92) contains the insert longitudinal axis (A), and intersects the two opposing insert side surfaces (94) and also the two opposing insert end surfaces (86);
    - an insert longitudinal plane (IP) located between the opposite insert side surfaces (94) contains the insert longitudinal axis (A), and intersects the opposing insert upper and lower surfaces (90, 92) and also the opposing insert end surfaces (86);
    - the insert lower surface (92) comprises at least one insert lower abutment surface (98); and
    - each insert bearing surface (102) comprises:
        - an insert upper abutment surface (104) which mutually faces away from the at least one insert lower abutment surface (98); and
        - an insert, stopper surface (110) which is closer to the associated cutting edge (96), and the insert lower abutment surface (98), than the insert upper abutment surface (104); wherein:
            - the insert upper abutment surface (104) is visible from an end view of the cutting insert (22) along the insert longitudinal axis (A) in front of the associated cutting edge (96); and
            - the insert upper abutment surface (104) and the insert stopper surface (110) slope towards the insert median plane (MP) in a direction towards the associated cutting edge (96), the insert stopper surface (110) sloping more steeply than the insert upper abutment surface (104).

9. The cutting insert (22), according to claim 8, wherein the insert, upper abutment surface (104) and the insert stopper surface (110) adjoin each other.

10. A double-ended cutting insert (22), longitudinally elongated in a direction defining an insert longitudinal axis (A), comprising:
- two opposing insert end surfaces (86) and an insert peripheral surface (88) extending therebetween, the insert peripheral surface (88) extending circumferentially about the insert longitudinal axis (A) and comprising opposing insert upper and lower surfaces (90, 92) and two opposing insert side surfaces (94) which all connect the two insert end surfaces (86);
- an insert central axis (F) perpendicular to and intersecting the longitudinal axis (A), the insert central axis (F) being located midway between the two insert end surfaces (86) and extending along a height direction of the insert;
- two cutting edges (96) formed at the intersection of the insert upper surface (90) and the two insert end surfaces (86), respectively; and
- a mounting projection (100) projecting from the insert upper surface (90), the mounting projection (100) comprising two insert bearing surfaces (102), offset in the direction of the insert longitudinal axis (A), and formed on the insert upper surface (90) above a cutting edge plane (EP), each cutting edge (96) being associated with the insert bearing surface (102) that is closest thereto; wherein:
    - the cutting insert exhibits 180° rotational symmetry about the insert central axis (F);

in both a side view and an end view of the cutting insert, the highest portion of the mounting projection (100) is at the insert central axis (F);

an insert median plane (MP) located between the insert upper and lower surfaces (90, 92) contains the insert longitudinal axis (A), and intersects the two opposing insert side surfaces (94) and also the two opposing insert end surfaces (86);

an insert longitudinal plane (IP) located between the opposite insert side surfaces (94) contains the insert longitudinal axis (A), and intersects the opposing insert upper and lower surfaces (90, 92) and also the opposing insert end surfaces (86);

the insert lower surface (92) comprises at least one insert lower abutment surface (98); and each insert bearing surface (102) comprises:
- an insert upper abutment surface (104) which mutually faces away from the at least one insert lower abutment surface (98); and
- an insert stopper surface (110) which is closer to the associated cutting edge (96), and the insert lower abutment surface (98), than the insert upper abutment surface (104); wherein:
  - the insert upper abutment surface (104) and the insert stopper surface (110) slope towards the insert median plane (MP) in a direction towards the associated cutting edge (96), the insert stopper surface (110) sloping more steeply than the insert upper abutment surface (104).

11. The cutting insert (22), according to claim 10, wherein the mounting projection (100) comprises two projecting insertion ridges (106), each insertion ridge (106) projecting from a respective insert upper abutment surface (104).

12. The cutting insert (22), according to claim 11, wherein each insertion ridge (106) extends centrally along an entire longitudinal extent of the insert upper abutment surface (104) so that each insert upper abutment surface (104) comprises two parallel insert upper abutment sub-surfaces (104a, 104b) which are co-planar and spaced apart from each other by the insertion ridge (106), on opposite sides of the insert longitudinal plane (IP).

13. The cutting insert (22), according to claim 12, wherein the insert upper abutment surface (104) and the insert stopper surface (110) adjoin each other.

14. The cutting insert (22), according to claim 13, wherein the insert upper abutment surface (104) is visible from an end view of the cutting insert (22) along the insert longitudinal axis (A) in front of the associated cutting edge (96).

15. The cutting insert (22), according to claim 14, wherein the insert upper abutment surface (104) is further from the cutting edge plane (EP) than the insert stopper surface (110).

16. The cutting insert (22), according to claim 10, wherein the insert upper abutment surface (104) and the insert stopper surface (110) adjoin each other.

* * * * *